A. D. KILBORN.
Oil-Cup.
No. 208,245. Patented Sept. 24, 1878.
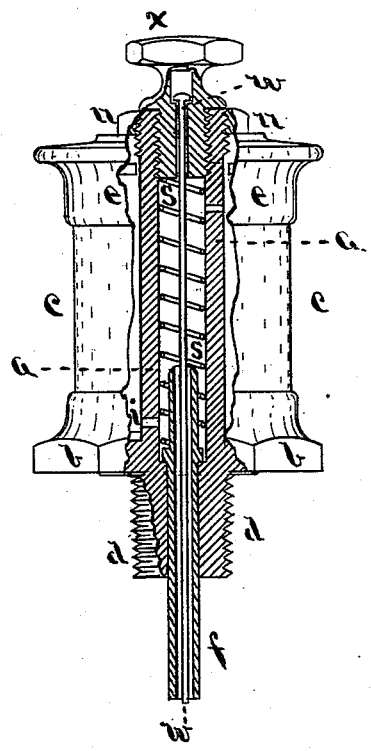

UNITED STATES PATENT OFFICE.

ALDEN D. KILBORN, OF OAKLAND, CALIFORNIA.

IMPROVEMENT IN OIL-CUPS.

Specification forming part of Letters Patent No. 208,245, dated September 24, 1878; application filed May 14, 1878.

*To all whom it may concern:*

Be it known that I, ALDEN D. KILBORN, of the city of Oakland, county of Alameda, State of California, have invented a new and useful Improvement in Oil-Cups, of which the following is a specification:

The invention relates to that class of oil-cups used for lubricating purposes, where a constant and equal flow of oil is required; and consists of an interior hollow column, which connects the external parts of the cup together, and is provided with a certain kind of tube and clearing-wire, by which the flow of oil is regulated and made constant, and also conducted directly to the bearing to be oiled.

The accompanying drawing shows an elevation, part of which being cut away shows a sectional view of the part embodying my invention, $a$ being a hollow column, which is made a part of and rigidly connected to $b$, which is flanged and formed for receiving the cylindrical or outer casing, $c$, of the cup, said casing being made of glass or metal. When made of metal, I prefer to construct $a$, $b$, and $c$ all of one piece, the shank $d$, in either case, being made a part of $b$, and is used for the purpose of screwing the cup into the metal surrounding the part to be oiled.

$e$ is a cap, that forms the top or cover of the cup, and is formed and flanged so as to fit over $c$, and firmly secured in its place by means of the nut $n$, which screws on the end of $a$, which passes through $e$, so that the nut $n$ will press upon the top $e$, thereby confining all the parts securely in their place.

The column $a$ is formed internally by having a hole through its entire length, including $d$. The hole is of two sizes, bored and counterbored, so that the larger bore will extend from the top to near the bottom of the cup, and the smaller bore will extend through the shank $d$. There are several apertures, $i$, in the column $a$, used to allow a free passage of the oil from the bore in $a$ to the space in the cup. The inner tube, $f$, is provided with a collar near its upper end, the collar being made to fit loosely in the larger bore of $a$ and form a valve-fit on the step—that is, where the larger bore ends and the smaller bore begins— so as to prevent the oil from passing out from between the tube $f$ and the inner surface of the bore in $d$, the tube $f$ being so proportioned in length as to extend out from the shank $d$, so that when the shank $d$ is screwed in the metal that surrounds the bearing, the tube $f$ will extend through the tap-hole until it reaches or comes nearly to the bearing, so that, as all the oil that passes out of the cup must pass through the hole in the tube $f$, it is evident that all the oil must come in actual contact with the bearing, and not be wasted by running over the surface, or in the cracks between the brasses, so that the centrifugal or other forces resulting from the motion or speed of the bearings would throw the oil away before it was properly utilized.

The upper end of the tube $f$ extends to about the level of the bottom of the cup, so that nearly all of the oil can run out by passing down the tube $f$.

On the top of the collar on the tube $f$, and around that part of the same that extends above the collar, is a spiral spring, S, used for the purpose of keeping the collar on $f$ down to its place, so as to prevent the oil from leaking out around the outside of the tube.

Above the nut $n$, and into the top of the column $a$, I screw a cap, $x$, into which is loosely hung a wire, $w$, said wire passing downward through the column $a$, spring S, and tube $f$, so as to come out about even with the end of $f$, the purpose of $w$ being to keep the passage through $f$ free by its looseness, and, working around, prevent the lodgment of any obstructions to the oil. It is also used for the purpose of limiting the flow or quantity of oil that passes through to the bearing, so when a small or large quantity of oil is required on the bearing the amount can be regulated by the relative size of the wire $w$ and the hole in tube $f$.

The cap $x$ is screwed in $a$, so as to be readily unscrewed when it is required to fill the cup with oil, which is done by pouring it in at the top of $a$, which passes into the cup through the perforations in the side of $a$. When the cap $x$ is taken out the wire $w$ is drawn out with it, so that every time the cap is removed the bore in $f$ is cleaned by drawing out and inserting the wire $w$. In this case the wire $w$ is attached loosely to $x$ by being hung by its upset head, but may, if desired, be rigidly attached to or driven into $x$.

If desired, the hollow column $a$ may be cast solid to the top $e$, and be screwed into the bottom $b$, instead of the way shown.

What I claim as new is—

The combination of the hollow column $a$ with the tube $f$, spring S, and wire $w$, attached to the cap $x$, substantially as and for the purposes set forth.

ALDEN D. KILBORN.

Witnesses:
    NOBLE FISHER,
    A. H. TURNER.